United States Patent [19]

Sandaiji et al.

[11] Patent Number: 5,041,189

[45] Date of Patent: Aug. 20, 1991

[54] METHOD OF PRODUCING A CORE FOR MAGNETIC HEAD

[75] Inventors: Hideto Sandaiji, Kasugai; Koji Ikeda; Yuji Onishi, both of Nagoya, all of Japan

[73] Assignee: NGK Insulators, Ltd., Japan

[21] Appl. No.: 579,584

[22] Filed: Sep. 10, 1990

[30] Foreign Application Priority Data

Sep. 8, 1989 [JP] Japan .................................. 1-231664

[51] Int. Cl.$^5$ ............................................. B23K 26/00
[52] U.S. Cl. .................................... 156/643; 156/656; 219/121.68; 219/121.69; 252/79.5
[58] Field of Search .............. 252/79.5; 156/643, 656, 156/664, 665, 667; 219/121.69, 121.68

[56] References Cited

U.S. PATENT DOCUMENTS

| | | | |
|---|---|---|---|
| 2,869,267 | 1/1959 | Holman | 252/79.5 |
| 3,300,349 | 1/1967 | Tershin et al. | 252/79.5 |
| 3,356,550 | 12/1967 | Stiffler et al. | 252/79.5 |
| 3,475,241 | 10/1969 | Zelley | 252/79.5 |
| 4,948,460 | 8/1990 | Sandaiji et al. | 156/659.1 X |
| 4,982,065 | 1/1991 | Sandaiji et al. | 156/643 X |

FOREIGN PATENT DOCUMENTS 1320260  6/1987  U.S.S.R. ............................... 252/79.5

Primary Examiner—David A. Simmons
Assistant Examiner—Thi Dang
Attorney, Agent, or Firm—Parkhurst, Wendel & Rossi

[57] ABSTRACT

A composite core for magnetic head composed of ferrite and Sendust, in which a difference between a track width of ferrite track and a track width of Sendust track is so small can be obtained by subjecting a gapped bar composed of ferrite and Sendust to a laser-induced etching in an alkali metal hydroxide aqueous solution into which additives for generating aluminate ion in the aqueous solution.

3 Claims, 6 Drawing Sheets

FIG_1

FIG_2

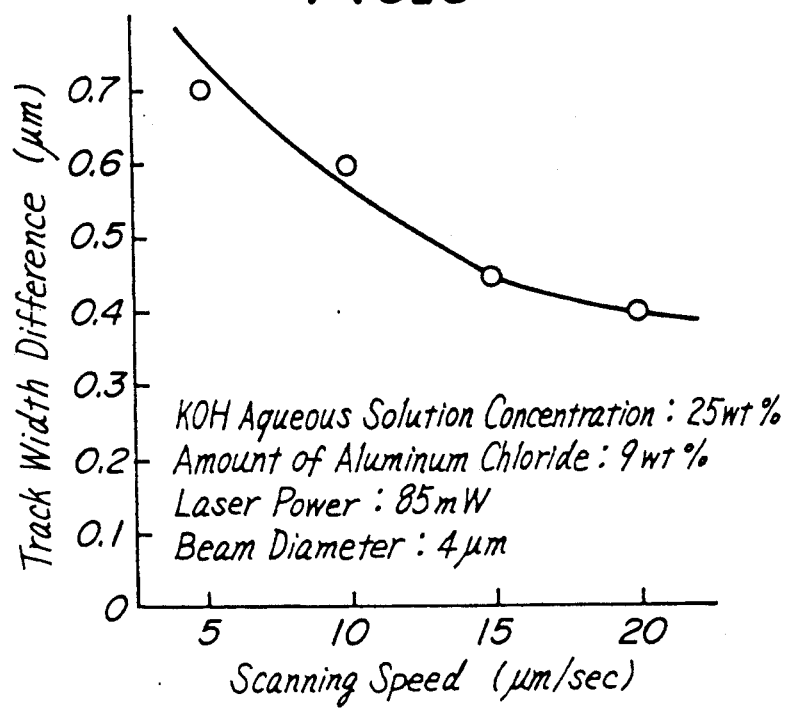
FIG_5
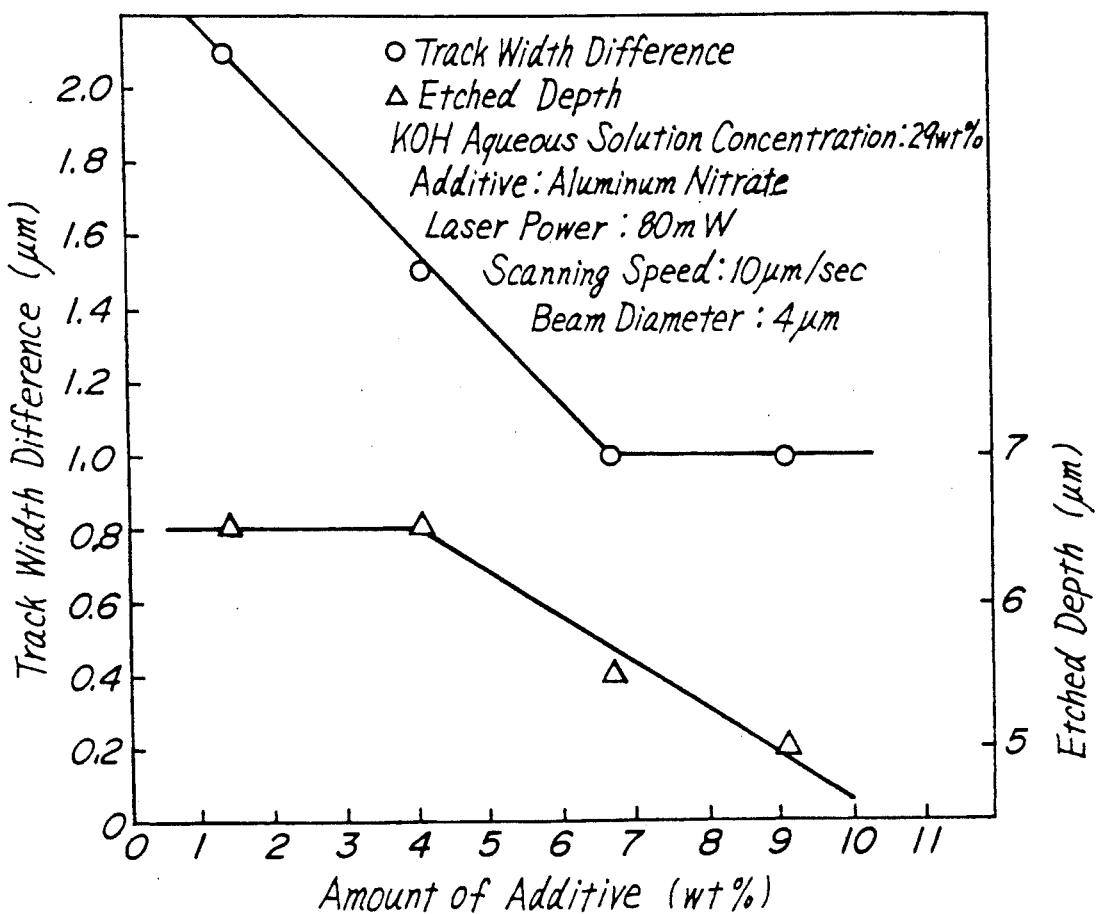
FIG_6

FIG.8a
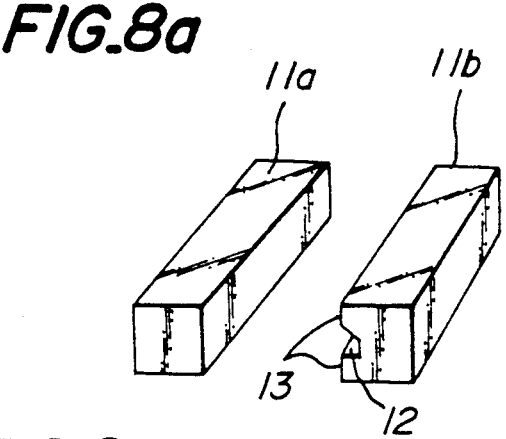
FIG.8b
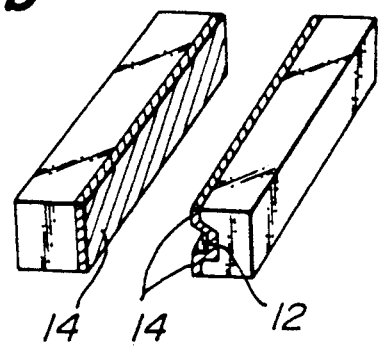
FIG.8c
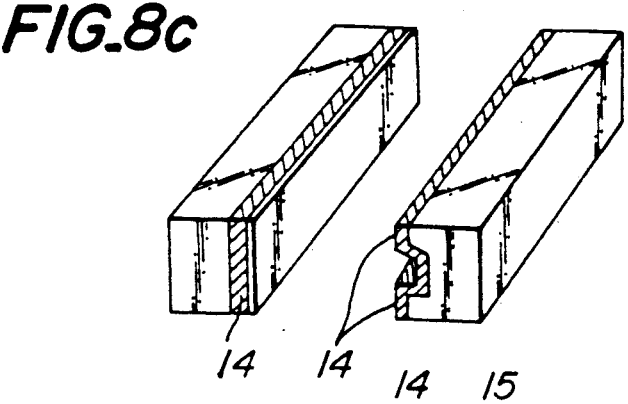
FIG.8d
FIG.8e
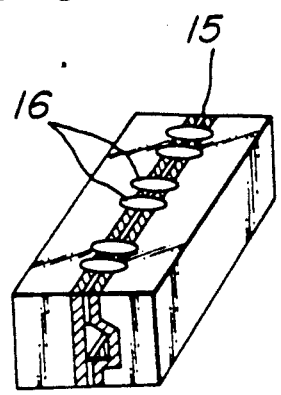
FIG.8f
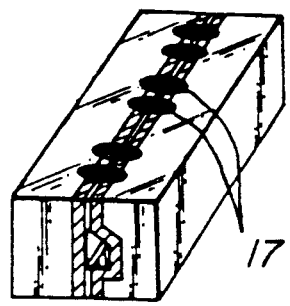
FIG.8g
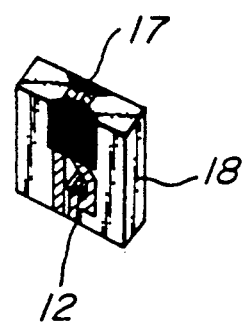
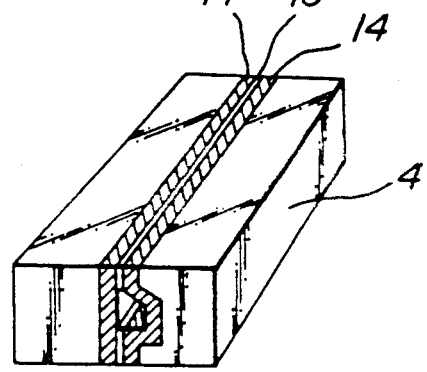

METHOD OF PRODUCING A CORE FOR MAGNETIC HEAD

BACKGROUND OF THE INVENTION

1. Field of the Invention

The present invention relates to a method of producing a core for magnetic head, and more particularly relates to a method of producing a core for magnetic head having track formed by a laser-induced etching wherein a thermochemical reaction is induced by a laser beam.

2. Related Art Statement

Recently, magnetic recorders, such as floppy disc drive (FDD), rigid magnetic disc drive (RDD), VTR or the like, have been steadily high-densified and, accordingly, the track width of the magnetic head tends to become narrower with a higher accuracy. Nowadays, the track width requires a dimensional accuracy lower than $\pm 2$ μm for VTR and FDD, or lower than $\pm 1$ μm for RDD.

In forming such cores for magnetic head, there have heretofore been known a laser machining in air of a track portion, which is disclosed in Japanese Patent Application Laid-open Nos. 29,1118/76, 212,617/82, etc. Further, Japanese Patent Application Nos. 117,726/80, 260,408/86, etc. disclose the formation of the track, by laser machining in air, of a core for magnetic head that is made of a high magnetic permeable alloy, such as Sendust (a ferromagnetic Fe-Si-Al alloy) or the like, or of a composite core for magnetic head that is composed of ferrite and a high magnetic permeable alloy.

However, according to these methods, since the temperature of the material to be machined reaches above the melting point temperature of the material, a processing strain due to heat is formed on the machined surface, accompanied with the formation of cracks on the surface, and properties of the resulting magnetic head are deteriorated. Further, these methods have presented problems such that melted and solidified substances or melted and scattered substances adhere to the machined surface and the vicinity thereof, as well as problems, such as a thermal strain, cracks or the like, to deteriorate the surface roughness or dimensional accuracy, which do not allow a track processing of high accuracy to be conducted with a dimensional accuracy lower than $\pm 2$ μm, which has recently been strongly required.

Meanwhile, Japanese Patent Application Laid-open No. 60,995/85, the Precision Machine Society, 1985, Spring Symposium, Scientific Lecture Articles (Presentation No. 404) and Engineering Materials, 33, No. 14 (P.57~p.62) disclose, in a field other than the magnetic head processing, three methods of machining ceramics, such as ferrite, $Si_3N_4$, SiC or the like, by a laser-induced etching wherein a laser beam is irradiated in a potassium hydroxide aqueous solution. However, any of these methods disclosed in the above references lack requirements for obtaining a high accuracy which is necessary for the magnetic head processing, so that the machining with such an accuracy as required in the magnetic head processing has not been performable.

SUMMARY OF THE INVENTION

The object of the present invention is to obviate the drawbacks of the above described conventional methods, particularly to obviate the drawback that the Sendust constituting of the magnetic head is eroded when the magnetic head is machined, and to provide a method wherein a track with a high accuracy is machined by a laser-induced etching method to produce cores for magnetic head with a high reliability.

According to the invention, in a method of producing a core for magnetic head, wherein a truck width of the composite core for magnetic head that is composed of ferrite and Sendust is defined by a laser machining, the improvement comprises that the laser machining is conducted in alkali metal hydroxide aqueous solution into which an additive for generating aluminate ion in the aqueous solution, is added.

In the above-mentioned method, a laser beam is irradiated to a surface of a gapped bar having a coil turn hole and a magnetic gap immersed in an alkali metal hydroxide aqueous solution, into which an additive for generating aluminate ion in the aqueous solution is added, and thus a highly precised track, in which Sendust constituting of the gapped bar is not so eroded that a difference between a track width of ferrite track portion and a track width of Sendust track portion is small, can be formed on the surface of the gapped bar.

The dimensional accuracy of grooves, which is formed in the gapped bar to define the track width, is required to be lower than $\pm 2$ μm, preferably lower than $\pm 1$ μm. And, it is required to make the difference between the track width of ferrite track portion and the track width of the Sendust track portion lower than 2 μm, preferably lower than 1 μm.

In the laser-induced etching method used in the method of the present invention, the alkali metal hydroxide aqueous solution serves as an etching solution for etching the surface of the gapped bar to make the grooves. Iron, that is a main composition of ferrite and Sendust, is etched in the alkali metal hydroxide solution with a high temperature in a good manner. However, aluminum, which is one of compositions of Sendust, is etched in the alkali metal hydroxide solution in an excessive manner. Therefore, when the gapped bar composed of ferrite and Sendust is etched in the alkali metal hydroxide solution, the Sendust constituting of the gapped bar is etched deeper than the ferrite constituting of the gapped bar. Thus, the track width of the track Sendust core becomes smaller than that of track ferrite core, so that the dimensional accuracy of the track deteriorates and the above-mentioned requirement for tracks could not be achieved. In the method according to the present invention, the improvement is conducted that the additive for generating aluminate ion in the alkali metal hydroxide aqueous solution is added in this aqueous solution, in order to restrain that the aluminum included in the Sendust is etched in an excessive manner. Therefore, according to the present invention, the track width difference between the track ferrite core and track Sendust core can be made lower than $\pm 2$ μm.

There are given aluminum, aluminum hydroxide, aluminum nitrate, aluminum chloride, aluminum sulfate, sodium aluminate, potassium aluminum sulfate, sodium aluminum sulfate, as the additive to be added into the alkali metal hydroxide aqueous solution for generating aluminate ion in the aqueous solution. It should be noted that the effect of restraining the excessive etching of aluminum contained in Sendust can be obtained by adding at least one kind of the additives mentioned in the above.

BRIEF DESCRIPTION OF THE DRAWINGS

FIG. 5 is a graph illustrating a relationship between a scanning speed of the laser beam and the difference between the track width of ferrite core track and that of Sendust core track;

FIG. 6 is a graph illustrating a relationship between the amount of the additives to be added for generating aluminate ion and the difference between the track width of ferrite core track and that of Sendust core track, and a relationship between the amount of additive and etched depth of grooves formed in the gapped bar;

FIGS. 8a to 8g are perspective views depicting the procedure in the case where the present invention is applied to the production of a ferrite/Sendust composite core for VTR magnetic head.

DESCRIPTION OF THE PREFERRED EMBODIMENTS (1) Structure of apparatus

Figure 1:
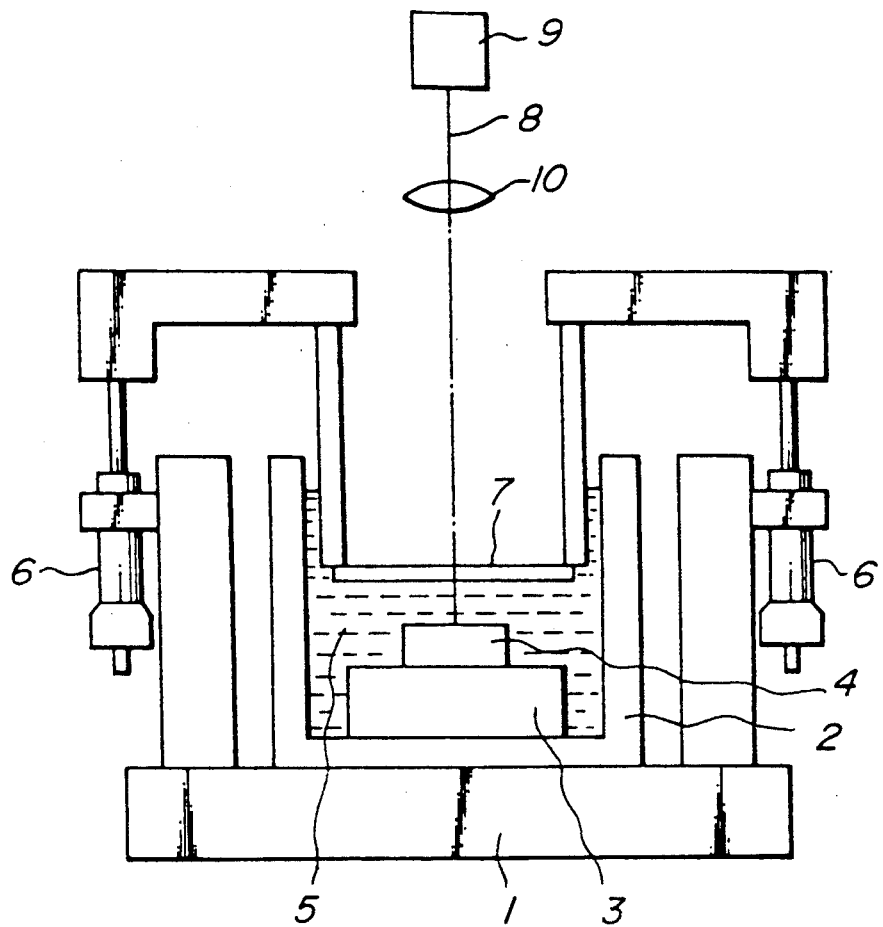
FIG. 1 is a diagrammatic view of one embodiment of apparatuses to be used for carrying out the present invention.

FIG. 1 illustrates an embodiment of an apparatus to be used for carrying out the present invention. In this embodiment, on an X-Y stage 1, placed a container 2. In the container 2, there are arranged a sample holder 3 and a gapped bar 4 to be processed. The container 2 is filled with an alkali metal hydroxide aqueous solution 5, such as potassium hydroxide, sodium hydroxide or the like, into which an additive for generating an aluminate ion in the aqueous solution 5. The liquid level of the aqueous solution 5 above the gapped bar 4 is controlled by a quartz window 7 whose position is adjustable by mans of a micrometer 6. If the liquid level of the aqueous solution 5 is established to be too low, the flow rate of the aqueous solution is decreased whereby the aqueous solution is heated up excessively and bubbles are apt to be generated. Therefore, the etched depth is decreased and the dimensional accuracy becomes to be lowered. When the liquid level is set at 200 μm or more, there may scarcely be such an influence. However, when the liquid level is too high, the light amount of the laser beam is decreased during the laser beam passes through the aqueous solution, the etched depth is decreased, or a convection is formed in the aqueous solution due to upward and downward flows of the solution. In case the convection is formed in the aqueous solution, waste ejected from the etching point or bubbles, are raised by the convection and the laser beam is scattered by the wastage and bubbles, resulting in decreases of the etched depth and dimensional accuracy. Therefore, it is preferred to set the liquid level at least 200 μm, more preferably 300~10,000 μm.

Further, the quartz window 7 serves to control the liquid level and eliminate the fluctuation of the liquid surface, resulting in the improvement of the dimensional accuracy. A laser beam 8 is emitted from a laser source 9 to irradiate onto the gapped bar 4 through a lens system 10 and the quartz window 7. Then, an etching of a predetermined pattern can be carried out by moving the X-Y stage 1.

Figure 2:
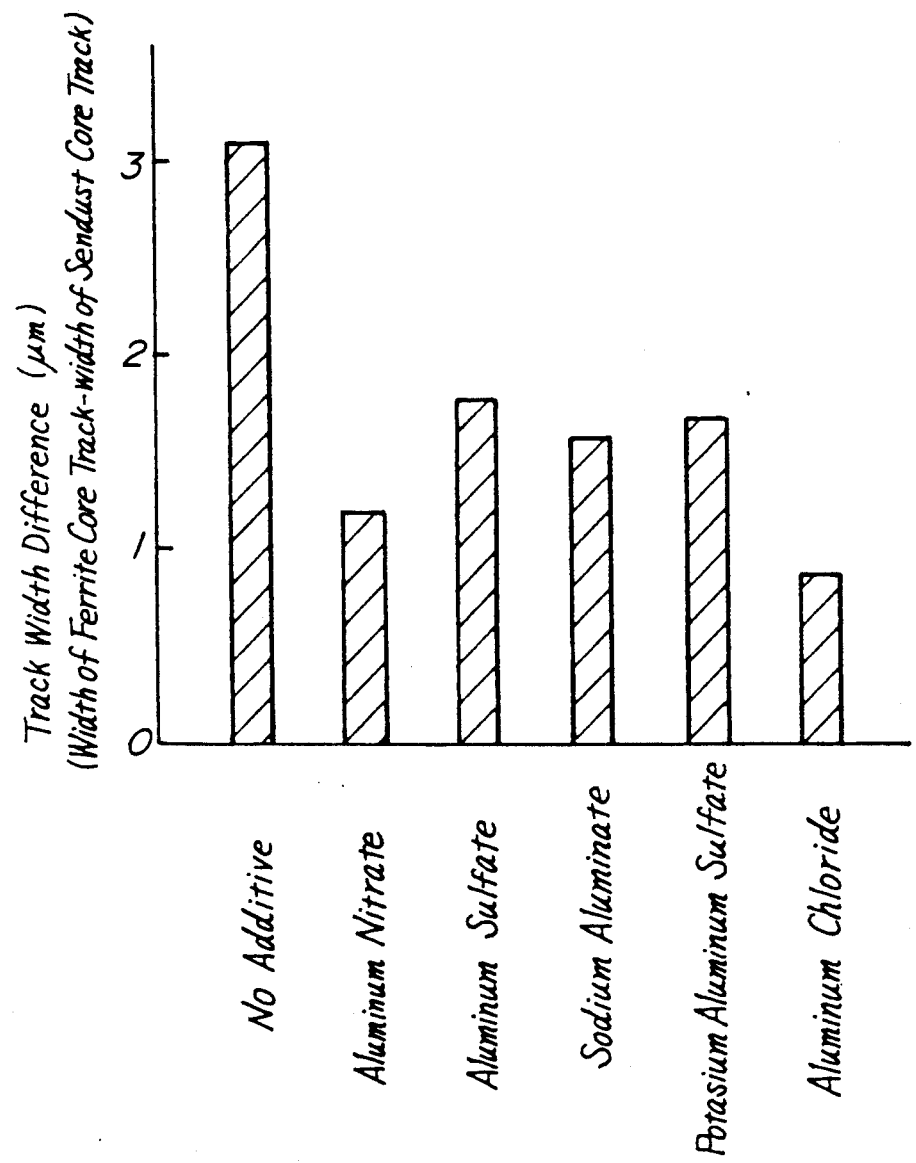
FIG. 2 is a graph showing differences between the track width of the track ferrite core and that of the track Sendust core, when the additive for generating aluminate ion is not added into the alkali metal hydroxide aqueous solution, and when various kinds of additives are added into the solution.

(2) Determination of etching condition:

In FIG. 2, the graph shows a track width difference between ferrite core track and Sendust core track, which is formed when the gapped bar is etched in the potassium hydroxide aqueous solution having a concentration of 25% in weight, into which no additive is added, by the laser beam having a beam diameter of 4 μm, a laser power of 80 mW and a scanning speed of 10 μm/sec; and various track width differences between ferrite core track and Sendust core track, which are formed when the gapped-bar is etched in the potassium hydroxide aqueous solution having a concentration of 25% in weight, into which aluminum nitrate of 5% in weight, aluminum sulfate of 5% in weight, sodium aluminate of 5% in weight, potassium aluminum sulfate of 5% in weight or aluminum chloride of 5% in weight is added as an additive, by the laser beam having a beam diameter of 4 μm, a laser power of 80 mW and a scanning speed of 10 μm/sec.

It is proved from FIG. 2 that in case no additive is added into the aqueous solution, the track width difference becomes more than 3 μm; contrary to this, in case any one of the additives is added into the aqueous solution, the track width difference becomes less than 2 μm; particularly, when the aluminum chloride is used as additive, the track width difference is 1 μm or less.

Figure 3:
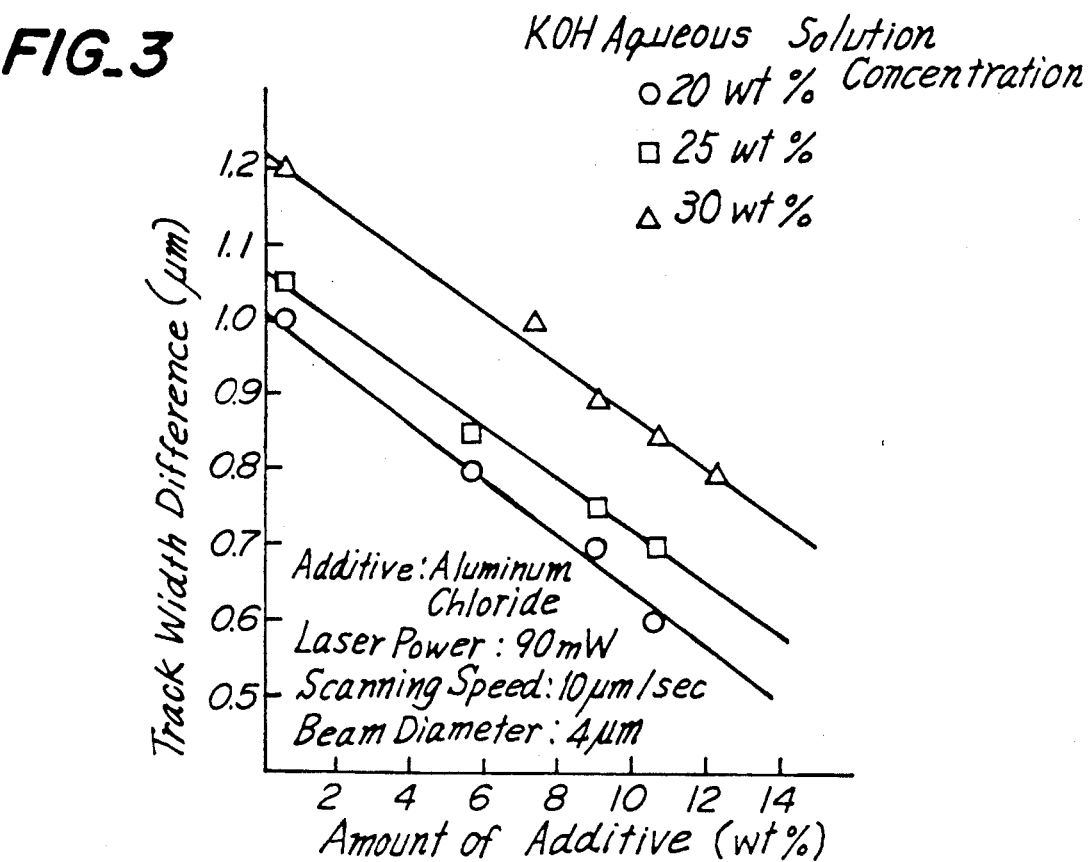
FIG. 3 is a graph illustrating a relationship between an amount of the additive for generating aluminate ion and the difference between the track width of the track ferrite core and that of the track senduct core.

In FIG. 3, the graph shows a variation of the track width difference when the gapped-bar is etched in the potassium hydroxide aqueous solution by the laser beam having a beam diameter of 4 μm, a laser power of 90 mW and a scanning speed of 10 μm/sec, and the amount of the aluminum chloride as an additive is varied. In FIG. 3, the line connecting marks O—O shows a relationship between the amount of the aluminum chloride added in the potassium hydroxide aqueous solution having a concentration of 20% in weight and the track width difference, □—□ a relationship between the amount of the aluminum chloride added in the potassium hydroxide aqueous solution having a concentration of 25% in weight and the track width difference, and △—△ a relationship between the amount of the aluminum chloride added in the potassium hydroxide aqueous solution having a concentration of 30% in weight and the track width difference.

It is proved from FIG. 3 that the track width difference becomes smaller in proportion to the increase of th amount of the additive to be added in the aqueous solution; and this tendency is also recognized in case the concentration of the aqueous solution is varied. Further, it is proved that when the amount of the additive is constant, the track width difference becomes smaller in proportion to the decrease of the concentration of the aqueous solution.

As stated in the above, the track width difference becomes smaller as the amount of the additive to be added is increased, but the track width difference is depending upon the concentration of the aqueous solution. Therefore, the range of the preferred amount of the additive to be added in the aqueous solution is varied in accordance with the concentration of the aqueous solution.

For instance, in the potassium hydroxide aqueous solution having a concentration of 20% in weight, into which the additive of 0.5% in weight is added, the track width difference of 1 $\mu$m or less can be obtained on the surface of the gapped bar. However, in the potassium hydroxide aqueous solution having a concentration of 25% in weight or 30% in weight, if the additive of 0.5% in weight is added into the aqueous solution, the gapped bar having a track width difference of 1 $\mu$m or less could not be obtained. Meanwhile, in case the amount of additive of 4% in weight is added into the aqueous solution having a concentration of 20% in weight or 25% in weight, the track width difference of the gapped-bar becomes 1 $\mu$m or less; however, in the aqueous solution having a concentration of 30% in weight, if the additive of 4% in weight is added into the aqueous solution, such gapped-bar cannot be obtained. Further, when the amount of additive is increased to 9% in weight, the gapped-bar having a track width difference of 1 $\mu$m or less can be obtained in the aqueous solutions of 20% in weight, 25% in weight or 30% in weight.

Therefore, an appropriate amount of the additive for obtaining gapped-bar having a desired track width difference should be selected taking the concentration of the alkali metal hydroxide aqueous solution into consideration. That is to say, when the gapped-bar is etched in the potassium hydroxide aqueous solution, into which the aluminum chloride is added as an additive, by using the laser beam having a beam diameter of 4 $\mu$m, a laser power of 90 mW and a scanning speed of 10 $\mu$m/sec., the appropriate range of the amount of aluminum chloride to be added is 0.5% in weight or more for the potassium hydroxide aqueous solution having a concentration of 20% in weight; 2% in weight or more for the potassium hydroxide aqueous solution of 25% in weight; and 6.5% in weight or more for the potassium hydroxide aqueous solution of 30% in weight.

Figure 4:
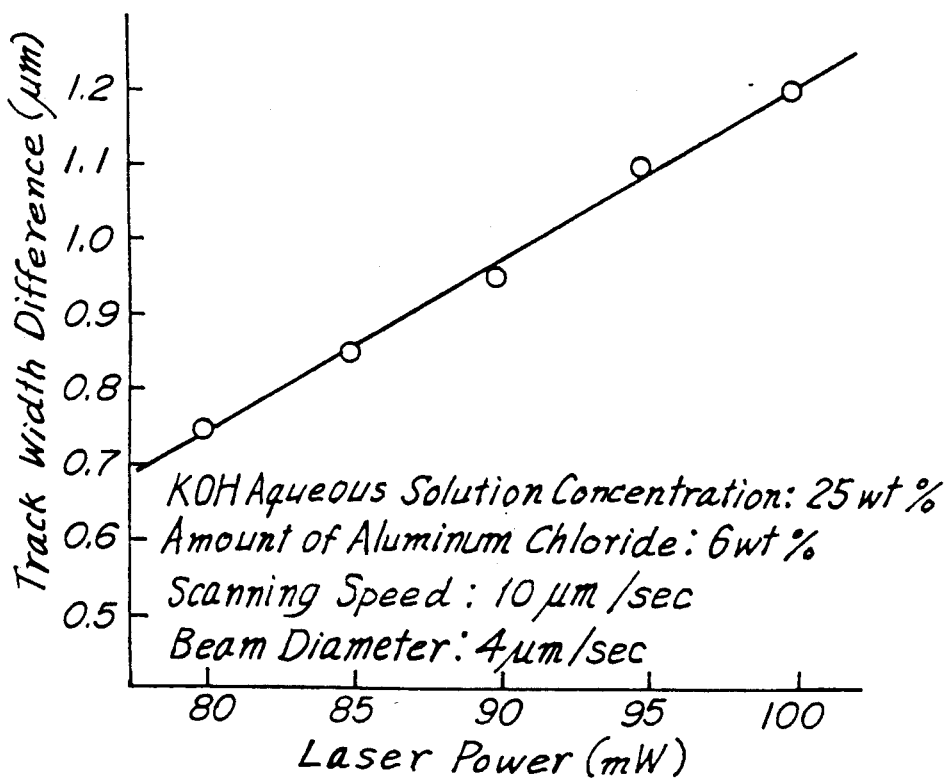
FIG. 4 is a graph illustrating a relationship between a power of the laser beam used in the method of the invention and the difference between the track width of the track ferrite core and that of the track Sendust core.

FIG. 4 is a graph depicting a variation of the track width difference formed on the surface of the gapped-bar, when the laser power of the laser beam to be irradiated on the surface of the gapped bar is varied. The gapped bar is etched in potassium hydroxide aqueous solution of 25% in weight, into which aluminum chloride of 6% in weight is added as an additive for generating aluminate ion, by using the laser beam having a beam diameter of 4 $\mu$m and scanning speed of 10 $\mu$m. From FIG. 4, it is proved that the track width difference becomes higher as the laser power of the laser beam is increased.

The track width difference is also depending upon the laser power of the laser beam irradiated on the surface of the gapped-bar. For instance, under the above-mentioned condition about the aqueous solution, the additive, the laser beam diameter and the scanning speed of the laser beam, when the laser power is 85 mW, it is possible to obtain the gapped-bar having the track width difference of 1 $\mu$m or less, but such track width difference cannot be obtained by using the laser beam having the power of 95 mW. Therefore, the amount of the additive to be added into the alkali metal hydroxide aqueous solution should be determined under taking the laser power of the laser beam to be irradiated on the surface of the gapped bar into consideration.

In FIG. 5, the variation of the track width difference is shown when the gapped-bar is etched in the potassium hydroxide aqueous solution having a concentration of 25% in weight, into which aluminum chloride of 9% in weight is added as additive for generating aluminate ion, by using the laser beam having a beam diameter of 4 $\mu$m and a laser power of 85 mW, but the scanning speed of the laser beam is varied. From FIG. 5, it is proved that the track width difference becomes smaller as the scanning speed of the laser beam becomes higher.

Therefore, it is proved that the appropriate range of the amount of the additive varies depending upon the scanning speed of the laser beam which is irradiated on the surface of the gapped bar. For instance when the scanning speed is 15 $\mu$m/sec., the gapped-bar having a track width difference of 0.5 $\mu$m or less can be obtained, but, when the scanning speed is 10 $\mu$m/sec., such gapped-bar can not be obtained. Therefore, the appropriate amount of the additive for obtaining the gapped-bar having a desired track width difference should be determined under taking not only th concentration of the alkali metal hydroxide aqueous solution and the laser power of the laser beam to be irradiated on the surface of the gapped bar but also the scanning speed of the laser beam into consideration.

As shown in FIG. 3, the more the amount of the additive, the less the etching of the aluminum included in Sendust; thus the track width difference formed on the surface of the gapped-bar becomes smaller as the amount of additive to be added into the alkali metal hydroxide aqueous solution is increased. However, when the additive is added too much into the aqueous solution, etching of the ferrite core is also restrained, so that the desired etched depth could not be obtained and the dimensional accuracy of grooves formed in the gapped bar would be decreased. Therefore, the appropriate amount of the additive should be determined under taking the desired track width difference, the desired etched depth and the desired dimensional accuracy into consideration.

In FIG. 6, a variation of the track width difference and a variation of the etched depth are shown, when the gapped-bar is etched in the potassium hydroxide aqueous solution having a concentration of 29% in weight, into which the aluminum nitrate is added as additive for generating aluminate ion but the amount thereof is varied, by using a laser beam having a beam diameter of 4 $\mu$m, a laser power of 80 mW and a scanning speed of 10 $\mu$m/sec. In FIG. 6, the line connecting marks O—O shows a relationship between the amount of the additive and the track width difference; and $\Delta$—$\Delta$ shows a relationship between the amount of the additive and the etched depth of the grooves.

From FIG. 6, it is proved that the track width difference becomes smaller until the amount of the additive is increased upto some point, but after the amount of the additive is added exceeding over the point, the variation of the track width difference becomes constant. Further, the etched depth is constant until the amount of additive is increased upto some point, but after the amount of additive is added into the aqueous solution exceeding over the point, the etched depth is decreased in accordance with the increase of the amount of additive.

As stated above, since the track width difference and the etched depth are varied as the variation of the amount of additive, the appropriate amount of additive to be added into the alkali metal hydroxide aqueous solution varies in accordance with the desired track width difference and the desired etched depth of the grooves.

For instance, when the additive of 1.4% in weight is added into the aqueous solution, the etched depth of 5 μm or more can be obtained, but the track width difference of 2 μm or less cannot be obtained; when the additive of 4.1% in weight is added, the etched depth would be 5 μm or more and the track width difference would be 2 μm or less; when the additive of 6.7% in weight is added, a gapped-bar having an etched depth of 5 μm or more and a track width difference of 1 μm or less can be obtained; and when the 10% in weight is added, the track width difference becomes 1 μm or less but it is not possible to obtain the etched depth of 5 μm or more.

When the gapped-bar is etched in the potassium hydroxide aqueous solution whose concentration is 29% in weight, into which aluminum nitrate is added as additive, by using a laser beam having a beam diameter of 4 μm, a laser power of 80 mW and a scanning speed of 10 μm/sec., the appropriate range of the addit obtain the track width difference of 2 μm and etched the depth of 5 μm or more is 2% to 9% in weight, and appropriate range of the amount of additive to obtain the track width difference of 1 μm or less and the etched depth of 5 μm or more is 6.5 to 9% in weight.

Figure 7:
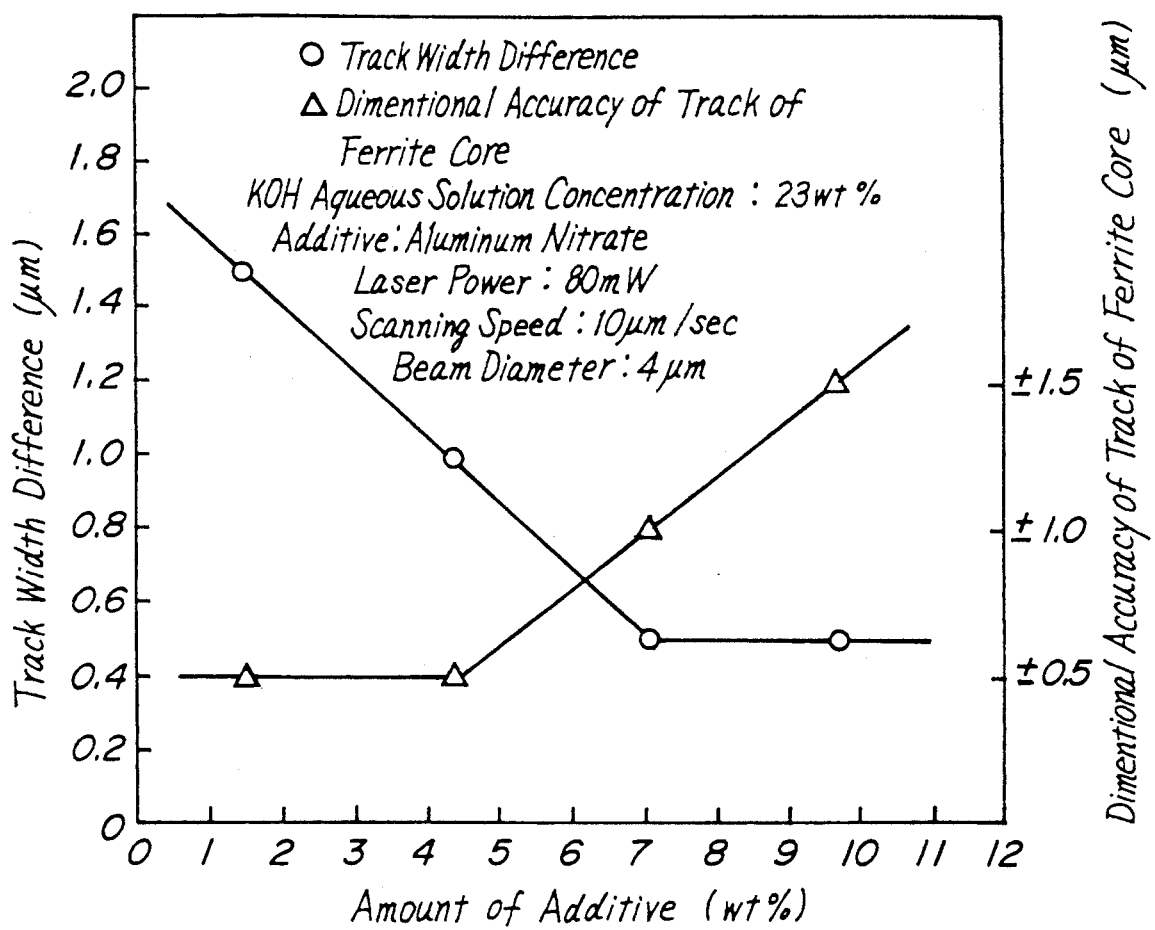
FIG. 7 is a graph illustrating a relationship between the amount of additives to be added for generating aluminate ion and the difference between the track width of ferrite core track and that of Sendust core track, and a relationship between the amount of additive and the dimensional accuracy of the track width of the track formed on the surface of the gapped bar.

FIG. 7 shows a variation of the track width difference and a variation of the dimensional accuracy of the track portion of the ferrite core, when the gapped-bar is etched in the potassium hydroxide aqueous solution whose concentration of 23% in weight, into which aluminum nitrate is added as an additive for generating aluminate ion, by using a laser beam having a beam diameter of 4 μm, a laser power of 80 mW, and a scanning speed of 10 μm/sec. In FIG. 7, the line connecting marks O—O shows a relationship between the amount of additive and the track width difference and Δ—Δ a relationship between the amount of additive and the dimensional accuracy.

From FIG. 7, the track width difference becomes smaller until the amount of additive is increased upto some point but the amount of additive is added into the solution exceeding over the point, the variation of track width difference becomes constant. Further, the dimensional accuracy of the track portion of ferrite core is constant until the amount of additive is increased up to some point, however, it is deteriorated after the amount of additive is added into the aqueous solution exceeding over the point. In such a manner, since the track width difference and the dimensional accuracy of the track of ferrite core are varied in accordance with the variation of the amount of additive to be added into the aqueous solution, the appropriate amount of the additive varies depending upon the desired track width difference and the desired dimensional accuracy of the track of ferrite core.

For instance, when the additive of 1.5% in weight is added into the aqueous solution, the dimensional accuracy of ±1 μm of the track portion of ferrite core can be obtained, but it is not possible to obtain the track width difference of 1 μm or less; when the additive of 4.4% in weight is added, it is possible to obtain the gapped-bar having the dimensional accuracy of ±1 μm or less of the ferrite core track and having the track width difference of 1 μm or less; when the additive of 7.1% in weight is added, it is possible to obtain the dimensional accuracy of ±1 μm or less of the ferrite core track and the track width difference of 0.5 μm or less; and when the additive of 9.7% in weight is added, the track width difference becomes 0.5 μm or less but it is not possible to obtain the dimensional accuracy of ±1 μm or less.

That is to say, when the gapped-bar is etched in the potassium hydroxide aqueous solution whose concentration is 23% in weight, into which aluminum nitrate is added as additive, the appropriate range of the amount of additive is 1.5 to 10% in weight to obtain the gapped-bar having a track width difference of 1.5 μm or less and a dimensional accuracy of ±1.5 μm of ferrite core track; and the appropriate range of the amount of additive is 4 to 7% in weight to obtain the gapped-bar having a track width difference of 1 μm or less and a dimensional accuracy of ±1 μm or less.

As shown in FIG. 3 to 7, the appropriate range of the amount of additive for generating aluminate ion varies depending upon the concentration of the alkali metal hydroxide aqueous solution, the laser power and the scanning speed of the laser beam, the desired track width difference, the desired etched depth and the desired dimensional accuracy of the ferrite core track.

Therefore, the range of the amount of additive should be determined under collectively taking the kind of the additives, the concentration of the aqueous solution, the laser power, the scanning speed and the diameter of the laser beam into consideration, according to the desired track width difference, the desired etching depth and the desired dimensional accuracy of the ferrite core track.

(3) Production of a core for magnetic head

FIGS. 8a to 8g show a flow diagram illustrating the procedure in the case where the present invention is applied to the production of a core for VTR magnetic head. On the outset, as shown in FIG. 8a, a ferrite bar 11a and a ferrite bar 11b having a coil turn hole 12 are prepared; and on surfaces 13 opposite to each other of the respective bars 11a, 11b are formed films 14 made of Sendust each having a thickness of 5 μm, as shown in FIG. 8b. Further, on the film 14 of the ferrite bar 11a, is formed non-magnetic material layer 15, such as $SiO_2$ layer, with the same thickness as a predetermined gap length, as shown in FIG. 8c; and thereafter these bars 11a and 11b are bonded with each other by means of a glass-cementing to form a gapped bar 4 having magnetic gap 15 as shown in FIG. 8d. Then, the prepared gapped bar 4 is set in the apparatus shown in FIG. 1; and a plural number of grooves 16 defining a track width 13 are machined on the gapped bar 4 as shown in FIG. 8e, under conditions such that the laser power is 150 mW, the scanning speed is 10 μm/sec, the focused laser beam diameter is 4 μm, the concentration of potassium hydroxide aqueous solution is 25% by weight, the concentration of aluminum chloride as additive is 8% by weight and the liquid level is 500 μm. Thereafter, as shown in FIG. 8f, glass 17 is embedded in the machined grooves 16, followed by grinding to a predetermined dimension. Lastly, cores having a predetermined width are cut out from the processed gapped bar. Thus, cores for VTR magnetic head 18 as shown in FIG. 8g are obtained.

On the thus obtained core for magnetic head 18, a highly accurate track that is free from microcracks or adhesion of solidified molten substances and in which the difference between the track width of Sendust core and the track width of ferrite core is so small is formed, which is high in reliability.

Additionally, the present invention is not intended to be limited to the manufacturing method of cores for VTR magnetic head and can be suitably applied to the cores for diversified magnetic heads, such as RDD, FDD, or the like. Further, the present invention is not limited to the track machining and also can be suitably utilized in various processings of ferrite materials, Sendust materials and further composite materials of ferrite and Sendust, such as machining of coil turn holes, machining of air bearing surface, or the like.

As described above, according to the producing method of the present invention, tracks having a narrow width can be formed on a gapped bar in a high accuracy without causing an erosion of Sendust by irradiating a predetermined laser beam at a predetermined scanning speed in an alkali metal hydroxide aqueous solution of a predetermined concentration with additives of a predetermined amount for generating aluminate ion, so that cores for magnetic head high is reliability can be produced.

What is claimed is:
1. In a method of producing a composite core for magnetic head composed of ferrite and ferromagnetic FE-Si-Al alloy, wherein a track width of the core for magnetic head is defined by a laser machining, the improvement comprising machining said core by a laser-induced etching in an alkali metal hydroxide aqueous solution into which at least one kind of additives for generating aluminate ion in the aqueous solution is added.
2. In a method according to claim 1, wherein:
said alkali metal hydroxide aqueous solution is potassium hydroxide aqueous solution.
3. In a method according to claim 1, wherein;
said additives are aluminum, aluminum hydroxide, aluminum nitrate, aluminum chloride, aluminum sulfate, sodium aluminate, potassium aluminum sulfate and sodium aluminum sulfate.

* * * * *